(12) United States Patent
Drzymala et al.

(10) Patent No.: US 8,534,559 B2
(45) Date of Patent: Sep. 17, 2013

(54) IMAGING SLOT SCANNER WITH MULTIPLE FIELD OF VIEW

(75) Inventors: Mark Drzymala, Commack, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 190 days.

(21) Appl. No.: 12/964,858

(22) Filed: Dec. 10, 2010

(65) Prior Publication Data

US 2012/0145790 A1 Jun. 14, 2012

(51) Int. Cl.
*G06K 7/10* (2006.01)

(52) U.S. Cl.
USPC ............ 235/462.41; 235/462.43; 235/472.01

(58) Field of Classification Search
USPC ............ 235/472.01, 472.02, 472.03, 462.14, 235/235/462.17, 462.43, 462.44, 462.45, 235/462.08, 462.09
See application file for complete search history.

(56) References Cited

U.S. PATENT DOCUMENTS 7,533,819 B2 * 5/2009 Barkan et al. ............ 235/462.09

* cited by examiner

*Primary Examiner* — Karl D Frech
(74) *Attorney, Agent, or Firm* — Nong-Qiang Fan

(57) ABSTRACT

An apparatus for capturing images of a target object having a barcode. The apparatus includes a portable housing configured for standing on top of a flat surface and a window on the portable housing. The apparatus also includes an imaging system configured to capture a first image of the target object within a first field of view through the window and to capture a second image of the target object within a second field of view through the window. The first field of view and the second field of view overlap with each other at a reference plane that is substantially parallel to the front face and located within a working distance of the imaging system.

25 Claims, 11 Drawing Sheets

IMAGING SLOT SCANNER WITH MULTIPLE FIELD OF VIEW

FIELD OF THE DISCLOSURE

The present disclosure relates generally to imaging-based barcode readers.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

FIG. 1A and FIG. 1B depict an imaging slot scanner 50 in accordance with some embodiments. The imaging slot scanner 50 has a window 56 and a housing 58. The imaging slot scanner 50 is typically a portable reader that has a base for supporting itself on a flat surface 30, such as, a countertop. The window 56 generally faces an operator at the workstation. As shown in FIG. 1A, the operator can slide or swipe the product 40 past the window 56 from right to left, or from left to right, in a "swipe" mode, to let an image of the barcode 40 on the product 42 be captured by the imaging slot scanner 50. Alternatively, the operator can present the barcode 40 on the product 42 to the center of the window 56 in a "presentation" mode. The choice depends on operator preference or on the layout of the workstation. In both the "swipe" mode and the "presentation" mode, the barcode 40 on the product 42 may not always face directly towards the window 56. But, even if the barcode 40 is rotated such that its orientation is not directly facing the window 56, the barcode 40 can still be successfully decoded by the imaging slot scanner 50, as long as the orientation of the barcode 40 relative to the window 56 is within certain range of orientations. It is generally desirable to increase this range of orientations within which the barcode 40 can be successfully decoded.

SUMMARY

In one aspect, the invention is directed to an apparatus for capturing images of a target object having a barcode. The apparatus includes a portable housing configured for standing on top of a flat surface with a front face bounded by a first side wall and a second side wall. The apparatus also includes a window on the portable housing. The apparatus also includes an imaging system configured to capture a first image of the target object within a first field of view through the window and to capture a second image of the target object within a second field of view through the window. The first field of view and the second field of view overlap with each other at a reference plane that is substantially parallel to the front face and located within a working distance of the imaging system.

Implementations of the invention can include one or more of the following advantages. An improved imaging slot scanner provides dual overlapping fields of view that can read a fence oriented bar code positioned in a direction that is rotated nearly 90 degrees from the direction directly facing the scanner window. The advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
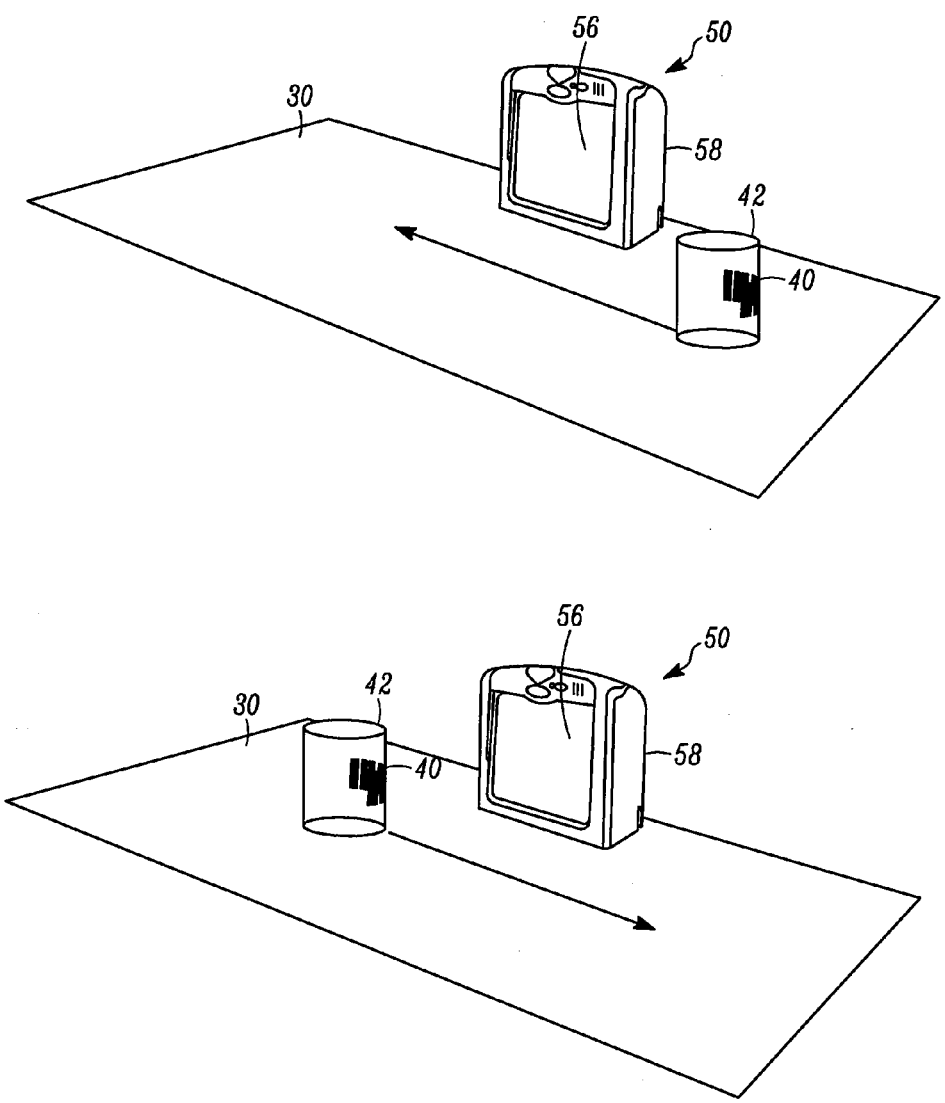
FIG. 1A and FIG. 1B depict an imaging slot scanner in accordance with some embodiments.
Figure 1B:
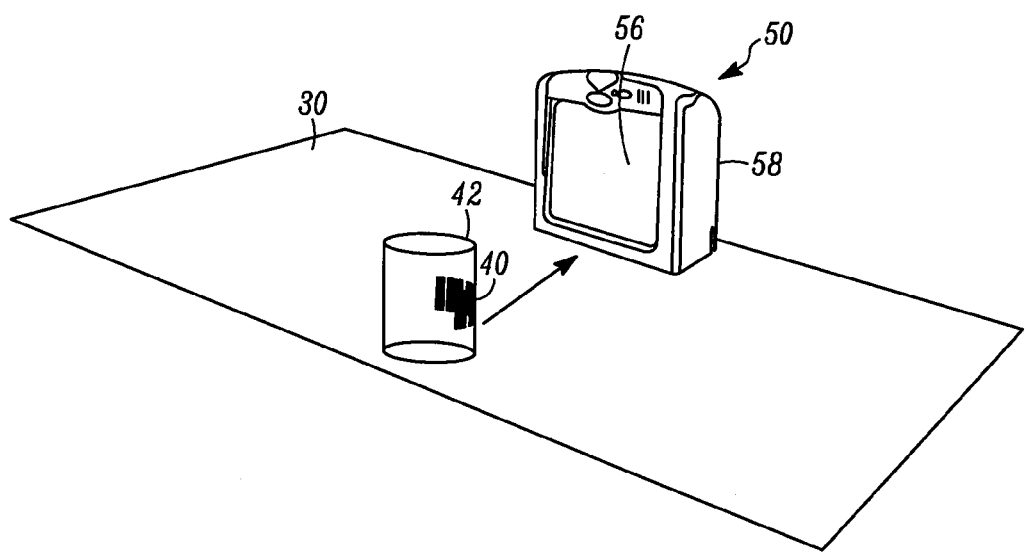

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
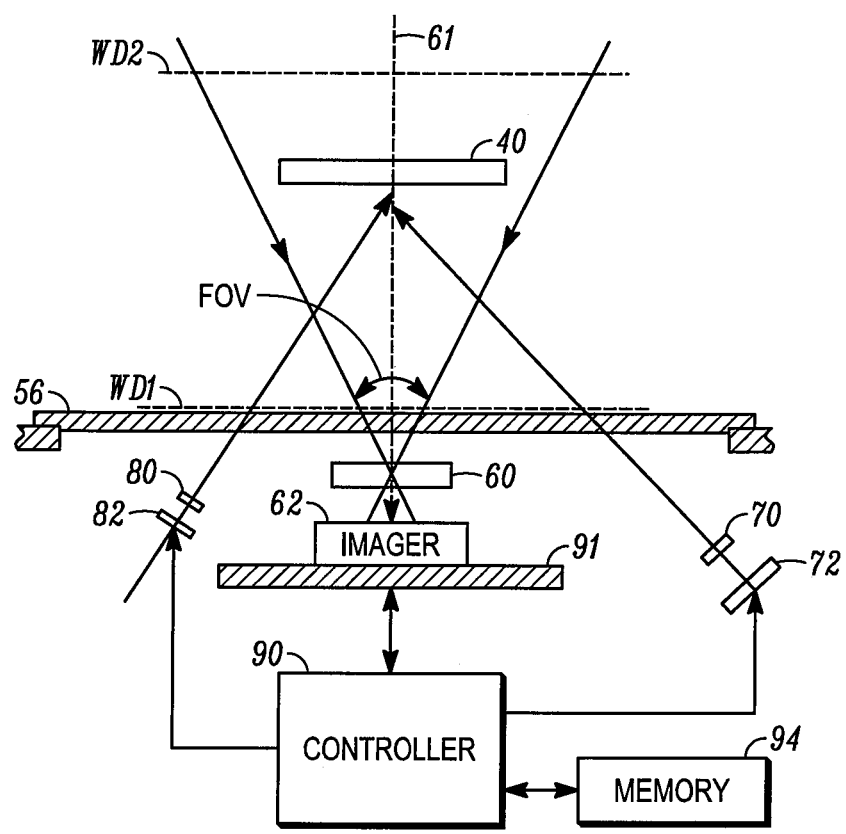
FIG. 2 is a schematic of an imaging scanner in accordance with some embodiments.

FIG. 2 is a schematic of an imaging slot scanner 50 in accordance with some embodiments. The imaging slot scanner 50 in FIG. 2 includes the following components: (1) a solid-state imager 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The solid-state imager 62 is mounted on a printed circuit board 91 in the imaging scanner.

The solid-state imager 62 can be a CCD or a CMOS imaging device. The solid-state imager 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The solid-state imager 62 is operative to detect light captured by an imaging lens assembly 60 along an optical path or axis 61 through the window 56. Generally, the solid-state imager 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is about a few inches from the window 56, and WD2 is about a few feet from the window 56. Some of the imaging scanners can include a range finding system for measuring the distance between the barcode 40 and the imaging lens assembly 60. Some of the imaging scanners can include an auto-focus system to enable a barcode be more clearly imaged with the solid-state imager 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the solid-state imager 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser or other kind of light sources.

In FIG. 2, the controller 90, such as a microprocessor, is operatively connected to the solid-state imager 62, the illumination source 72, and the aiming light source 82 for controlling the operation of these components. The controller 90 can also be used to control other devices in the imaging scanner. The imaging slot scanner 50 includes a memory 94 that can be accessible by the controller 90 for storing and retrieving data. In many embodiments, the controller 90 also includes a decoder for decoding one or more barcodes that are within the field of view (FOV) of the imaging slot scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the solid-state imager 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3A:
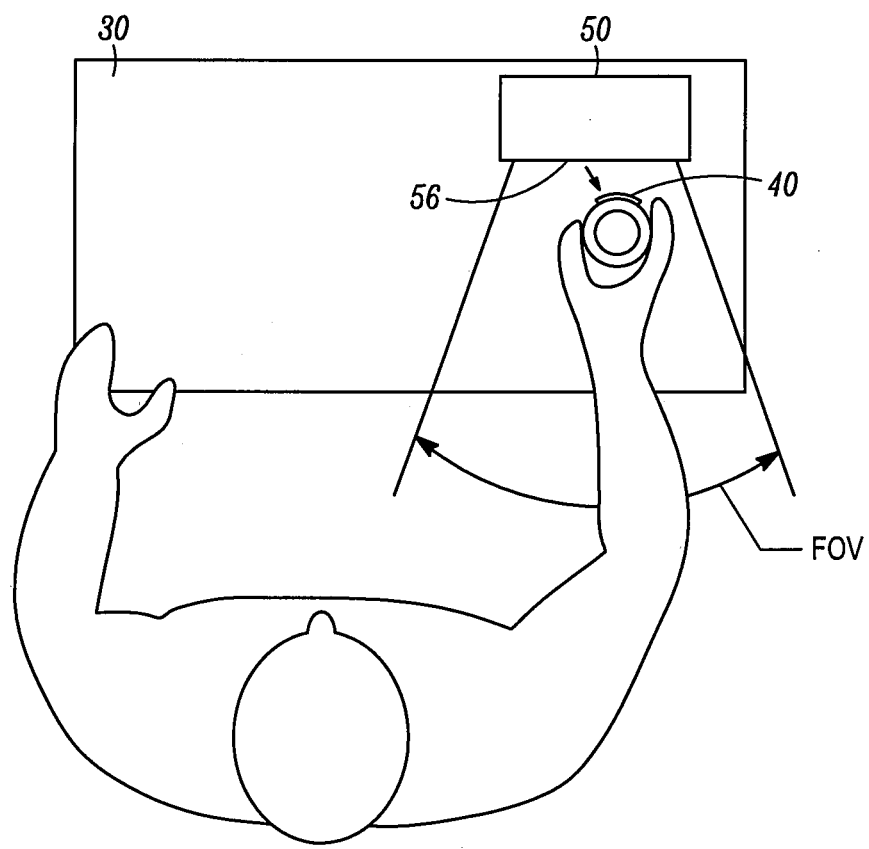
FIG. 3A and FIG. 3B illustrate two scenarios in which a barcode is positioned in front of an imaging slot scanner that has only a single field of view.
Figure 3B:
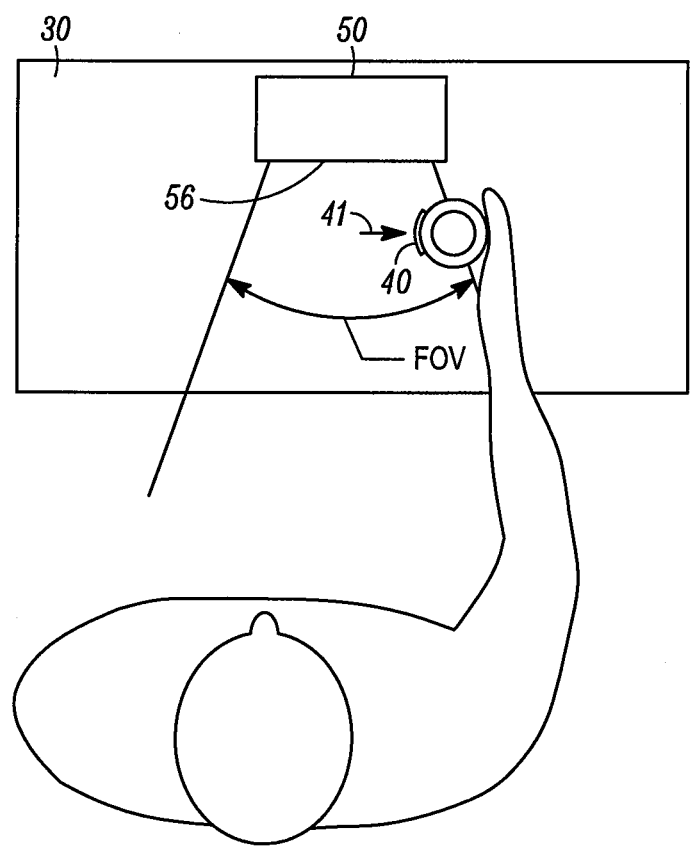

FIG. 3A and FIG. 3B illustrate two scenarios in which a barcode 40 is positioned in front of an imaging slot scanner 50 that has only a single field of view (FOV). In FIG. 3A, when the barcode 40 faces directly towards the window, it is generally possible for the imaging slot scanner 50 to capture an image of the barcode 40 and successfully decode it. In FIG. 3B, however, when the center 41 of the barcode 40 points to a direction that is essentially perpendicular to the center ray of the FOV (i.e., the center 41 of barcode 40 points to a direction that that is essentially parallel to the front surface of the imaging slot scanner 50), it can be very difficult or sometimes impossible to decode the barcode 40 successfully, if the barcode is in the "fence" orientation (i.e., with the bars perpendicular to the flat surface 30). It is desirable to have an improved imaging slot scanner that can decode the barcode 40 successfully even if the barcode 40 is positioned and orientated as shown in FIG. 3B.

Figure 4:
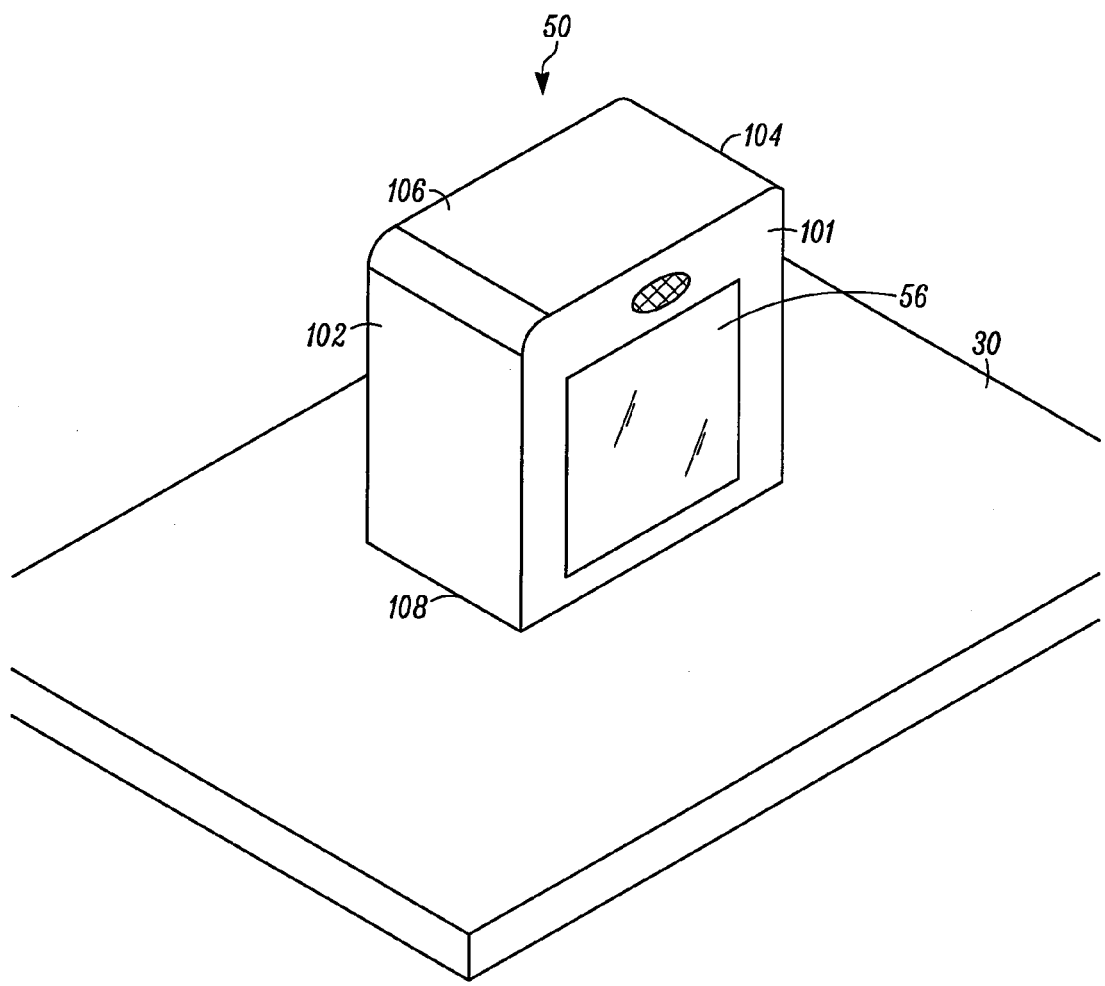
FIG. 4 is an imaging slot scanner positioned atop a flat surface.
Figure 5A:
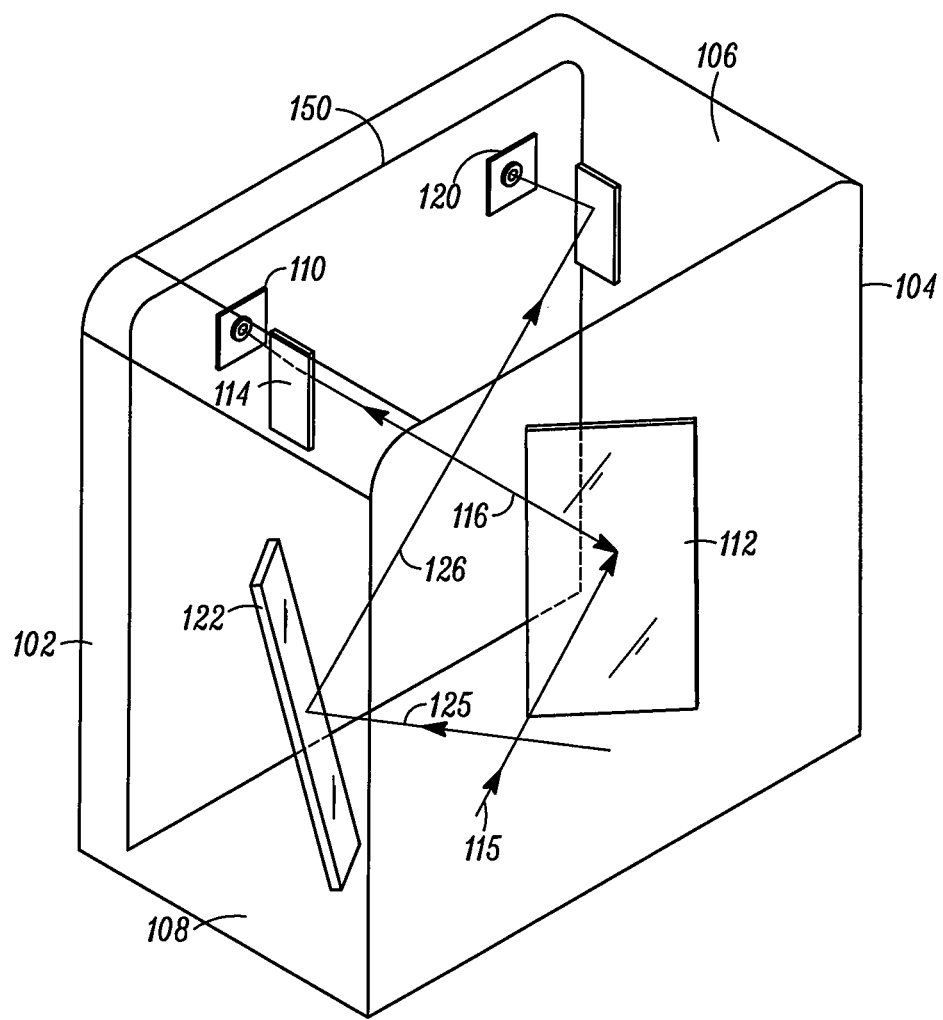
FIG. 5A and FIG. 5B depict an imaging slot scanner having two FOVs and two solid-state imagers in accordance with some embodiments.
Figure 5B:
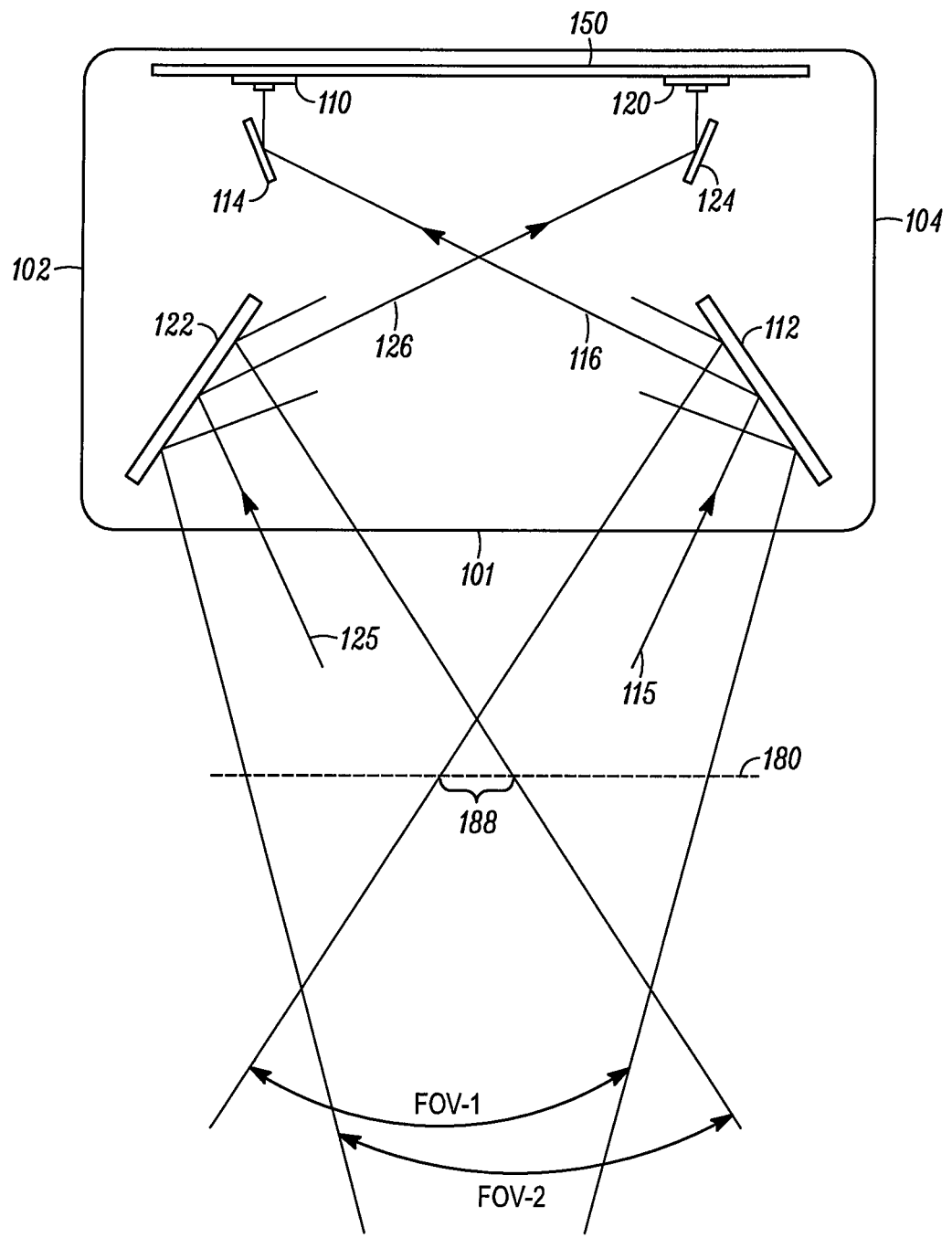

FIG. 4 and FIGS. 5A-5B depict an imaging slot scanner 50 having two FOVs in accordance with some embodiments. The imaging slot scanner 50 includes a portable housing configured for standing on top of a flat surface 30. The imaging slot scanner 50 has a front face 101 that is bounded by a first side wall 102, a second side wall 104, a top wall 106, and a bottom wall 108. In some preferred implementations, the distance between the first side wall 102 and the second side wall 104 is less than 20 cm. The majority part of the front face 101 is covered with a window 56. In some implementations, the window 56 is configured to be substantially parallel to the front face 101. In other implementations, the window 56 can be titled with respect to the front face 101.

The imaging slot scanner 50 also includes a circuit board 150 located inside the portable housing. The circuit board 150 is substantially parallel to the front face 101. In some implementations, the distance between the circuit board 150 and the front face 101 is less than 12 cm. There are two solid-state imagers 110 and 120 installed on the circuit board 150. The first solid-state imager 110 having an array of photosensitive elements is configured to capture light passing through the window 56 that is received from a first field of view FOV-1. The second solid-state imager 120 having an array of photosensitive elements is configured to capture light passing through the window 56 that is received from a second field of view FOV-2. As shown in FIG. 5B, the first field of view FOV-1 and the second field of view FOV-2 overlap with each other at a reference plane 180 that is substantially parallel to the front face 101.

Figure 7:
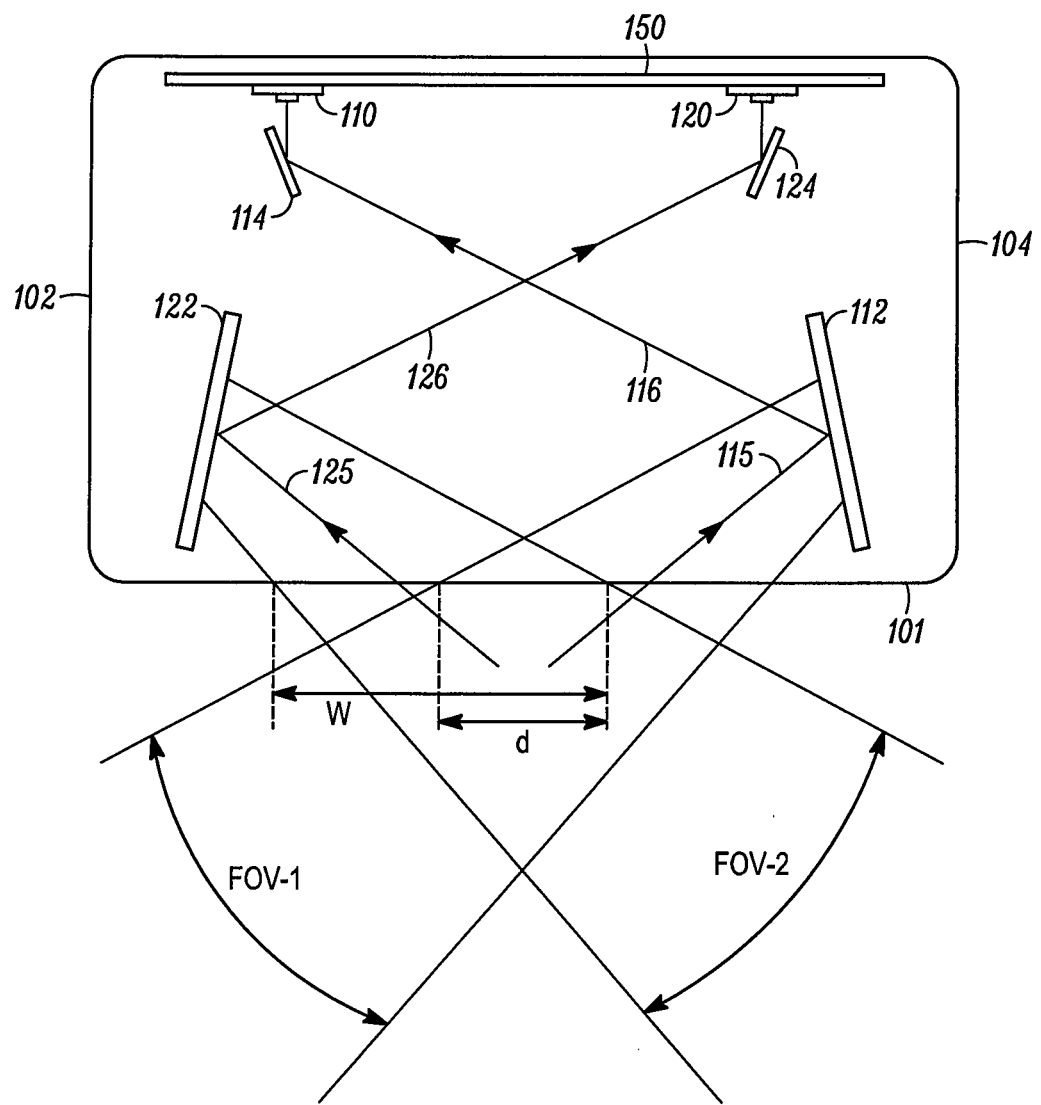
FIG. 7 depict that two FOVs overlap with each other at the front face of the imaging slot scanner in accordance with some embodiments.

In some implementations, there is always some overlap 188 of the two FOVs on the reference plane 180 as long as the reference plane 180 is located within a working distance of both the first solid-state imager 110 and the second solid-state imager 120. In one implementation, the working distance of both the first solid-state imager 110 and the second solid-state imager 120 is about 20 cm as measured from the front face 101. In some implementations, as shown in FIG. 7, the first field of view FOV-1 and the second field of view FOV-2 already overlap with each other at the front face 101. In one exemplary implementation, the overlapping distance d of the two FOVs at the front face 101 can be designed to be about 2 cm, and the width w of each FOVs at the front face 101 is about 11 cm.

As shown in FIGS. 5A-5B, the imaging slot scanner 50 includes a first primary mirror 112 and a first supplementary mirror 114. The first primary mirror 112 is located near the second side wall 104, and the first supplementary mirror 114 is positioned atop the first solid-state imager 110 relative to the circuit board 150. The first primary mirror 112 is configured to reflect light 115 received from the first field of view FOV-1 onto the first supplementary mirror 114. The first supplementary mirror 114 is configured to reflect light 116 received from the first primary mirror 112 onto the first solid-state imager 110.

As shown in FIGS. 5A-5B, the imaging slot scanner 50 also includes a second primary mirror 122 and a second supplementary mirror 124. The second primary mirror 122 is located near the first side wall 102, and the second supplementary mirror 124 is positioned atop the second solid-state imager 120 relative to the circuit board 150. The second primary mirror 122 is configured to reflect light 125 received from the second field of view FOV-2 onto the second supplementary mirror 124. The second supplementary mirror 124 is configured to reflect light 126 received from the second primary mirror 122 onto the second solid-state imager 120.

Figure 6A:
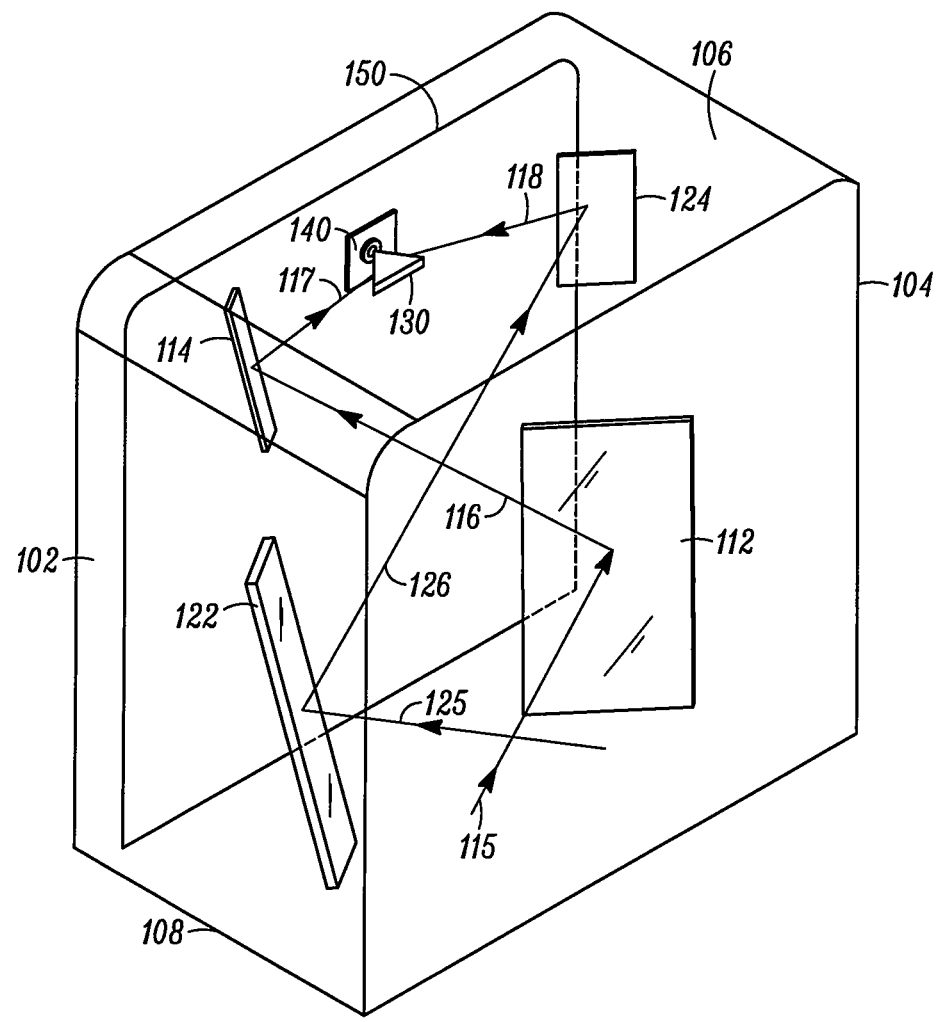
FIG. 6A and FIG. 6B depict an imaging slot scanner having two FOVs and an optical field-of-view splitter for use with one solid-state imager in accordance with some embodiments.
Figure 6B:
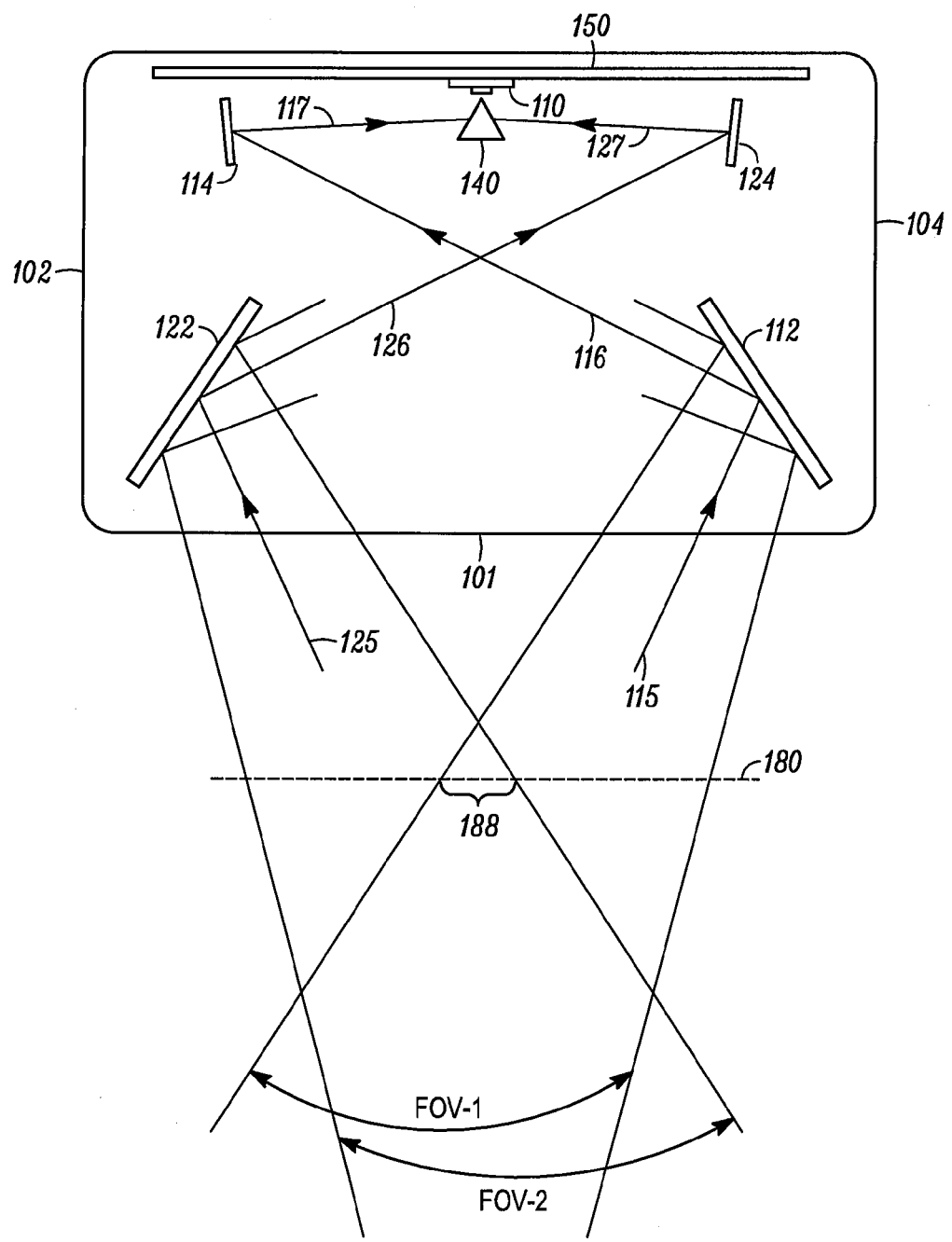

In some other embodiments, as shown in FIGS. 6A-6B, the imaging slot scanner 50 uses a solid-state imager 140 and an optical field-of-view splitter 130 to generate two FOVs. In one implementation, the optical field-of-view splitter 130 is located atop the solid-state imager relative to a circuit board 150. The optical field-of-view splitter 130 can be a wedge optical splitter or constructed from two mirrors. The array of photosensitive elements in the solid-state imager 140 is divided into a first group of photosensitive elements and a second group of photosensitive elements.

In FIGS. 6A-6B, the first primary mirror 112 is configured to reflect light 115 received from the first field of view FOV-1 onto the first supplementary mirror 114. The first supplementary mirror 114 is configured to reflect light 116 received from the first primary mirror 112 onto the optical field-of-view splitter 130. The optical field-of-view splitter 130 redirect the light 117 received from the first supplementary mirror 114 onto the first group of photosensitive elements in the solid-state imager 140.

Similarly, in FIGS. 6A-6B, the second primary mirror 122 is configured to reflect light 125 received from the second field of view FOV-2 onto the second supplementary mirror 124. The second supplementary mirror 124 is configured to reflect light 126 received from the second primary mirror 122 onto the optical field-of-view splitter 130. The optical field-of-view splitter 130 redirect the light 127 received from the second supplementary mirror 124 onto the second group of photosensitive elements in the solid-state imager 140.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a portable housing configured for standing on top of a flat surface with a front face bounded by a first side wall, a second side wall, a top wall and a bottom wall;
   a window on the portable housing;
   a first solid-state imager having an array of photosensitive elements for capturing light passing through the window and received from a first field of view;
   a second solid-state imager having an array of photosensitive elements for capturing light passing through the window and received from a second field of view;
   wherein the first field of view and the second field of view overlap with each other at a reference plane that is substantially parallel to the front face and located within a working distance of both the first solid-state imager and the second solid-state imager; and
   a circuit board located inside the portable housing configured to hold the first solid-state imager and the second solid-state imager thereon, the circuit board being substantially parallel to the front face.

2. The apparatus of claim 1, wherein the first field of view and the second field of view already overlap with each other at the front face.

3. The apparatus of claim 1, wherein the first field of view and the second field of view already overlap with each other at the window.

4. The apparatus of claim 1, wherein the distance between the first side wall and the second side wall is less than 20 cm.

5. The apparatus of claim 1, wherein the first field of view and the second field of view overlap with each other at a reference plane that is substantially parallel to the front face and located within 20 cm from the front face.

6. The apparatus of claim 1, wherein the window is located at the front face and substantially parallel to the front face.

7. The apparatus of claim 1, further comprising:
   a first primary mirror located near the second side wall;
   a first supplementary mirror; and
   wherein the first primary mirror is configured to reflect light received from the first field of view onto the first supplementary mirror, and the first supplementary mirror is configured to reflect light received from the first primary mirror onto the first solid-state imager.

8. The apparatus of claim 7, wherein the first supplementary mirror is located atop the first solid-state imager relative to the circuit board.

9. The apparatus of claim 1, further comprising:
   a second primary mirror located near the first side wall;
   a second supplementary mirror; and
   wherein the second primary mirror is configured to reflect light received from the second field of view onto the second supplementary mirror, and the second supplementary mirror is configured to reflect light received from the second primary mirror onto the second solid-state imager.

10. The apparatus of claim 9, wherein the second supplementary mirror is located atop the second solid-state imager relative to the circuit board.

11. An apparatus for capturing images of a target object having a barcode comprising:
    a portable housing configured for standing on top of a flat surface with a front face bounded by a first side wall, a second side wall, a top wall and a bottom wall;
    a window on the portable housing;
    an imaging system configured to capture a first image of the target object within a first field of view through the window and to capture a second image of the target object within a second field of view through the window;
    wherein the first field of view and the second field of view overlap with each other at a reference plane that is substantially parallel to the front face and located within a working distance of the imaging system;
    wherein the imaging system comprises (1) a first solid-state imager having an array of photosensitive elements for capturing light passing through the window and received from the first field of view, and (2) a second solid-state imager having an array of photosensitive elements for capturing light passing through the window and received from the second field of view; and
    a circuit board located inside the portable housing configured to hold the first solid-state imager and the second solid-state imager thereon, the circuit board being substantially parallel to the front face.

12. The apparatus of claim 11, wherein the first field of view and the second field of view already overlap with each other at the front face.

13. The apparatus of claim 11, wherein the first field of view and the second field of view already overlap with each other at the window.

14. The apparatus of claim 11, wherein the distance between the first side wall and the second side wall is less than 20 cm.

15. The apparatus of claim 11, wherein the first field of view and the second field of view overlap with each other at a reference plane that is substantially parallel to the front face and located within 20 cm from the front face.

16. The apparatus of claim 11, wherein the window is located at the front face and substantially parallel to the front face.

17. The apparatus of claim 11, further comprising:
    a first primary mirror located near the second side wall;
    a first supplementary mirror; and
    wherein the first primary mirror is configured to reflect light received from the first field of view onto the first supplementary mirror, and the first supplementary mirror is configured to reflect light received from the first primary mirror onto the first solid-state imager.

18. The apparatus of claim 11, further comprising:
    a second primary mirror located near the first side wall;
    a second supplementary mirror; and
    wherein the second primary mirror is configured to reflect light received from the second field of view onto the second supplementary mirror, and the second supplementary mirror is configured to reflect light received from the second primary mirror onto the second solid-state imager.

19. An apparatus for capturing images of a target object having a barcode comprising:
    a portable housing configured for standing on top of a flat surface with a front face bounded by a first side wall, a second side wall, a top wall and a bottom wall;
    a window on the portable housing;
    an imaging system configured to capture a first image of the target object within a first field of view through the window and to capture a second image of the target object within a second field of view through the window;

wherein the first field of view and the second field of view overlap with each other at a reference plane that is substantially parallel to the front face and located within a working distance of the imaging system;

wherein the imaging system comprises a solid-state imager having an array of photosensitive elements dividing into a first group of photosensitive elements and a second group of photosensitive elements, an optical field-of-view splitter, a first primary mirror located near the second side wall and configured to reflect light received from the first field of view onto the first group of photosensitive elements in the solid-state imager through the optical field-of-view splitter, and a second primary mirror located near the first side wall and configured to reflect light received from the second field of view onto the second group of photosensitive elements in the solid-state imager through the optical field-of-view splitter; and a circuit board located inside the portable housing configured to hold the solid-state imager thereon, the circuit board being substantially parallel to the front face.

20. The apparatus of claim 19, wherein the optical field-of-view splitter is located atop the solid-state imager relative to a circuit board.

21. The apparatus of claim 19, wherein the optical field-of-view splitter comprises a wedge optical splitter.

22. The apparatus of claim 19, wherein the optical field-of-view splitter comprises two mirrors.

23. An apparatus for capturing images of a target object having a barcode comprising:

a portable housing configured for standing on top of a flat surface with a front face bounded by a first side wall, a second side wall, a top wall and a bottom wall;

a window on the portable housing;

an imaging system having at least one solid-state imager and configured to capture a first image of the target object within a first field of view through the window and to capture a second image of the target object within a second field of view through the window;

a circuit board located inside the portable housing configured to hold the at least one solid-state imager thereon, the circuit board being substantially parallel to the front face; and wherein the first field of view and the second field of view overlap with each other at a reference plane that is substantially parallel to the front face and located within a working distance of the imaging system.

24. The apparatus of claim 23, wherein the first field of view and the second field of view overlap with each other at a reference plane that is substantially parallel to the front face and located within 20 cm from the front face.

25. The apparatus of claim 23, wherein the window is located at the front face and substantially parallel to the front face.

* * * * *